June 27, 1933.  C. M. GERE  1,915,487
APPARATUS FOR CURING CHEESE
Filed Dec. 2, 1930
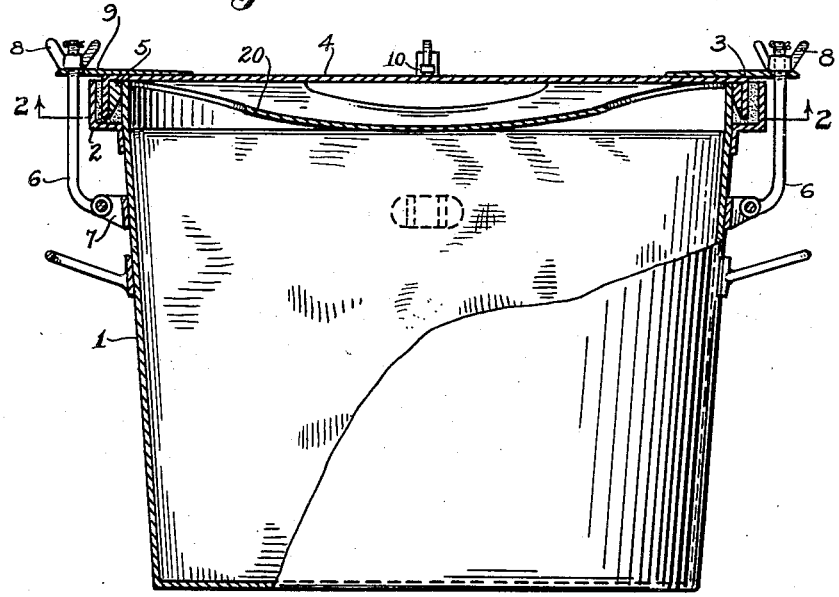
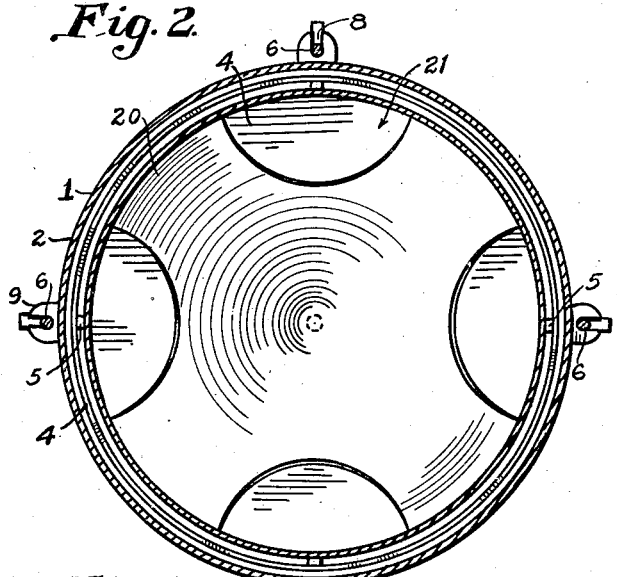
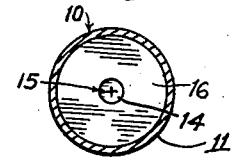
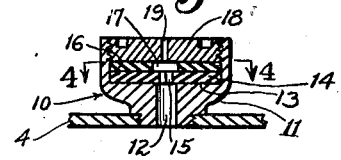
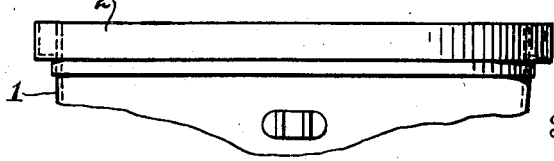
Inventor
Clair M. Gere
By Mason Fenwick Lawrence
Attorneys Patented June 27, 1933

1,915,487

UNITED STATES PATENT OFFICE

CLAIR M. GERE, OF BELFAST, NEW YORK, ASSIGNOR TO NATURAL CHEESE CORPORATION, OF DOVER, DELAWARE, A CORPORATION OF DELAWARE

APPARATUS FOR CURING CHEESE

Application filed December 2, 1930. Serial No. 499,601.

This invention relates to the process of curing cheese and other products amenable to a similar curing process, and to apparatus by means of which this process may be carried out.

One of the objects of this invention is the curing of the cheese in an atmosphere of carbon dioxide autogenously produced, whereby oxygen is excluded from the cheese so that mould growth is suppressed on the surface of the cheese or in such fissures as may occur in said surface.

Another object of the invention is the isolation of the cheese from atmospheric air while curing, avoiding the formation of rind and shrinkage due to evaporation.

Still another object of the invention is the provision of a container for confining cheese and for determining the inundation of the cheese by an envelope of carbon dioxide, to the exclusion of air, the carbon dioxide being produced by the normal fermentation of the cheese.

A further object of the invention is the provision of a receptacle fitting the cheese and having a relief valve opening against an excess pressure of carbon dioxide in said receptacle but closing against the entrance of atmospheric air into said container.

Still another object of the invention is the provision in said container of means for protecting the valve from being occluded by the cheese should the latter, through puffing, rise to the level of the valve.

Other objects of the invention will appear as the following description of a preferred and practical embodiment thereof proceeds.

In the drawing in which the same reference characters have been used throughout the several figures to designate identical parts and embodiment of the receptacle through which the processes may best be carried out, is shown, in which Figure 1 is a vertical section, partly in elevation, of the container.

Figure 2 is a cross section taken along the line 2—2 of Figure 1.

Figure 3 is a vertical section through the relief valve.

Figure 4 is a horizontal section taken along the line 4—4 of Figure 3, and

Figure 5 is a vertical fragmentary elevation of the container.

Before adverting to a description in detail of the several figures it may be stated that the usual method of curing cheese is to set the molded cheeses on shelves in a curing room and to permit them to become seasoned while exposed to the atmosphere. This method is uneconomic for a number of reasons among which is the fact that the cheese is a good culture for mould growth in the presence of the oxygen of the air, so that in the course of curing, the cheese becomes invested on its outer surface and in such fissures as may occur in its mass, with a mould growth, which, under certain conditions optimum for said growth may extend throughout the texture of the cheese.

Another disadvantage of curing the cheese in the presence of air is the shrinkage due to the evaporation and the formation of a rind incident to said evaporation, which rind must be subsequently removed by the processes of the cheese, and representing a total loss.

By the present invention a curing process is provided by which all of these disadvantages are obviated. The present process embraces the principle of inundating the cheese in an enveloping atmosphere of carbon dioxide gas to the exclusion of atmospheric air, so that, the oxygen not being present, the growth of mould is entirely suppressed. Furthermore the process provides for the confinement of the cheese in a close fitting chamber so that evaporation does not take place and therefore shrinkage and the formation of a rind does not occur. Preferably the envelope of carbon dioxide is produced autogenously through the natural fermentation of the cheese.

Referring now in detail to the several figures, the numeral 1 represents a receptacle for holding the preformed cheese. The dimensions of the receptacle are determined with respect to the size of the cheese so as to fit it closely and thus avoid the presence of any air pockets of considerable magnitude.

The receptacle 1 is provided with a peripheral flange 2 forming a channel 3 about the top edge of the receptacle. A lid 4 is provided, having a circumferential flange 5 which fits freely into the channel 3. A fluid-tight joint is formed between the receptacle and its lid by pouring a molten sealing substance such as paraffine, into the channel 3.

Any suitable means may be employed for securing the lid to the receptacle, such for instance as the tumble bolts 6 which, as shown, are pivotally mounted in lugs 7 arranged on the sides of the receptacle. The tumble bolts 6 enter slots 8 formed in extensions 9 provided on the lid 4.

A relief valve which in general is designated by the reference character 10 is provided in the lid 4. Said relief valve may consist of the casing 11 which is screwed or otherwise secured to said lid and which has a bore 12 communicating with the chamber of said receptacle.

The casing 11 is provided with a flat annular surface 13 on which is seated the valve proper, consisting of two discs preferably of rubber and preferably cemented together, and the lower disc being preferably cemented to the annular surface 13. The lower disc 14 has a small slit 15 punched in the middle thereof. The upper disc 16 has a hole 17 with which the slit 15 in the lower disc registers. A screw plug 18 bears upon the upper face of the disc 16, said screw plug having a vent 19 communicating with the hole 17.

The hole 17 functions to permit the lower disc 14 to belly outwardly under pressure from beneath, and so to open slightly the slit 15 and to permit escape of excess pressure of carbon dioxide from the receptacle. Under normal conditions, and when the excess pressure has been relieved, the disc 16 resumes its planar form and the slit closes, preventing atmospheric air from entering the receptacle.

In operation, the cheese is placed in the receptacle, the latter closed by the lid and the joint between the lid and receptacle luted by hot paraffine boring into the channel 3. Since the cheese fits the sides and bottom of the receptacle, there are no large air spaces which might resist the incursion of the carbon dioxide gas and which might, therefore, act as nuclei for mould fermenation. The cheese is kept at the proper temperature to promote normal fermentation and in the course of fermenting carbon dioxide gas is produced which fills such interstices as may exist between the cheese and the walls of the receptacle or in the fissures of the cheese itself. The inundation of the cheese by the carbon dioxide envelope displaces the residual air or diffuses with it to such an extent that it cannot support mould propagation. When the carbon dioxide gas has accumulated to the point beyond which an undesirable pressure would be produced, it is vented through the valve by bellying out the central portion of the disc 14 in the manner hereinbefore described. The return of the valve to its normal closed position prevents the entrance of atmospheric air and avoids dilution of the carbon dioxide envelope.

The confinement of the cheese prevents material evaporation of moisture therefrom and in consequence suppresses the formation of a rind. It may sometimes happen that when exposed to excess temperature during the curing process the cheese might puff, rising to the top of the receptacle and occluding the valve so as to prevent it subsequently from functioning. In order to avoid this contingency a shield or a baffle 20 has been provided which is preferably of dished shape, presenting its convex side to the cheese. The shield is preferably formed of resilient material and is slightly smaller in diameter than the mouth of the receptacle. It may be cut away as indicated at 21 in Figure 2 to provide communication between the valve and that part of the receptacle below the shield, in which the cheese is located. The shield preferably rests on the top of the cheese and rises with the cheese as the latter puffs, finally coming into contact with the lid. Further rise of the cheese flattens the shield so that it finally lies flat against the bore 12 of the valve, preventing the cheese from gaining access to said bore.

As fermentation subsides, the shield 20 resumes its original shape and position.

While I have in the above description disclosed what I believe to be preferred and practical embodiment of novel apparatus through which my curing process may be practiced, it is to be understood that the details of construction as shown are merely by way of example and not to be considered as limitative in their bearing upon the scope of the invention as claimed.

What I claim as my invention is:

1. Apparatus for curing a preformed cheese comprising a receptacle, a lid making a fluid-tight joint with said receptacle, a relief valve at the top of said receptacle, and a shield between the cheese and said valve and out of contact with said valve for protecting the latter from being contacted by said cheese.

2. Apparatus for curing a preformed cheese as claimed in claim 1, said shield being of resilient material, and a dished shape with the convex side adapted to rest upon said cheese, said shield being of somewhat smaller size than the mouth of said receptacle, whereby when pressed by the rising of said cheese it functions by flattening towards the lid of said receptacle.

3. Apparatus for curing a preformed cheese comprising a receptacle within which said cheese closely fits, means forming a peripheral channel at the mouth of said receptacle, a lid having a flange entering said channel, means within said channel forming a lute for the joint between said lid and receptacle, and a relief valve in said lid comprising a flexible member having a slit normally closed when said member is in unstressed condition, said member being adapted to distort in the region of said slit under excess pressure within said receptacle for opening said slit.

In testimony whereof I affix my signature.
CLAIR M. GERE.